2,988,814
TUBE CUTTER
Robert H. Carpenter, Fort Wayne, Ind., assignor to The Weatherhead Company, Cleveland, Ohio, a corporation of Ohio
Filed Oct. 29, 1959, Ser. No. 849,637
7 Claims. (Cl. 30—102)

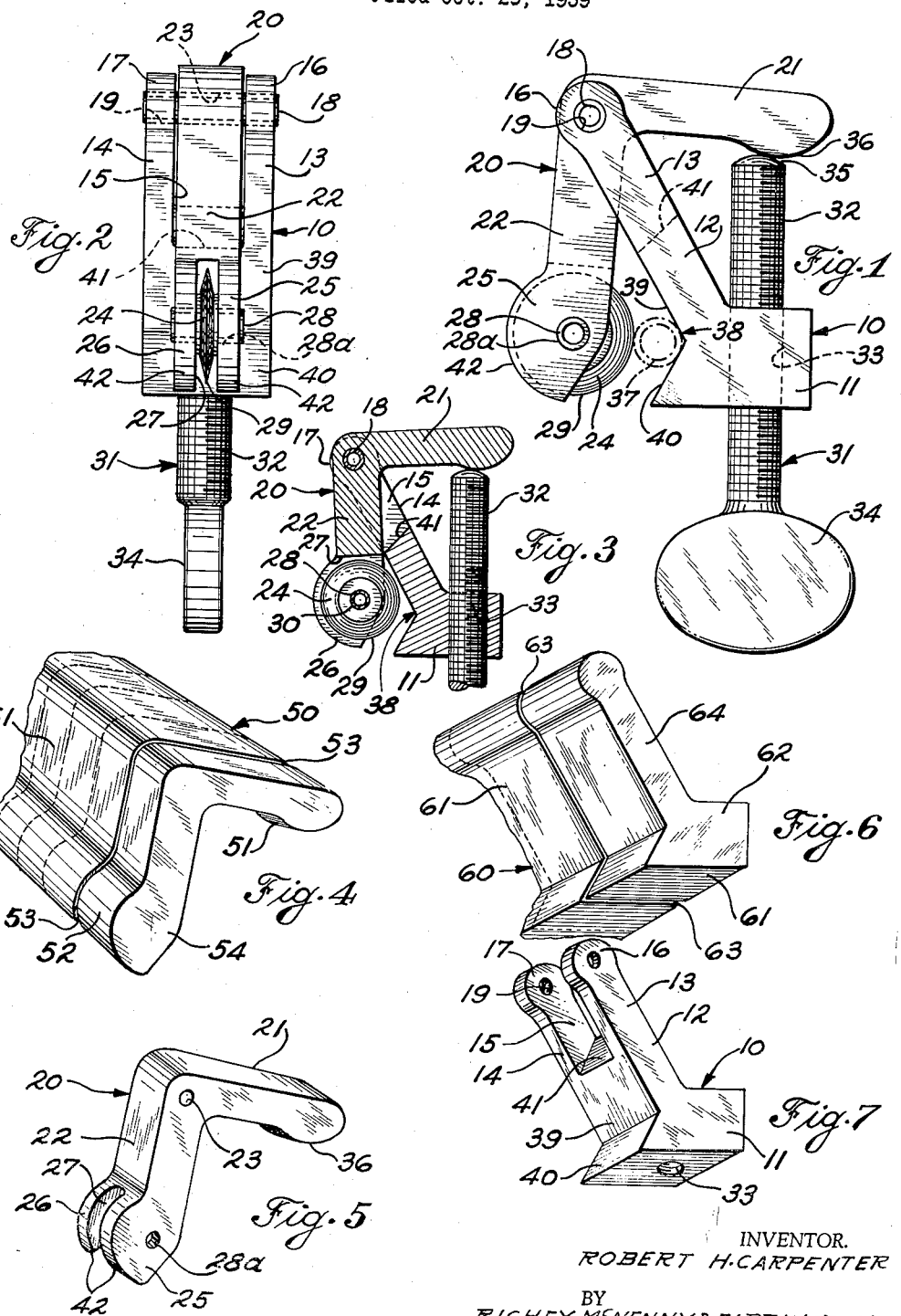

This invention relates to tube cutters, and more particularly to hand operated tube cutters adapted to cut thin wall tubing.

In making field repairs on fuel and hydraulic lines and lubrication systems, such as used in motor vehicles and machinery, it is frequently necessary to repair and replace the metal or plastic tubing or pipe used for such lines and systems. Such tubing is usually connected by means of tube fittings of various types which are attached to the end of the tube. The installation of many types of these fittings require that the cut tube end be smooth and free from burrs as well as square with the axis of the tube. It is not practical to produce a cut end of the necessary quality by cutting the tube with a hack saw because of the difficulty of making a cut which is absolutely square with the tube axis, and the use of a hack saw is time consuming and requires a fairly rigid support for the tube being cut, which is often not available. It has been found that such tubing can be satisfactorily cut with a tool using an annular cutter wheel which is forced against the side of the tube under pressure and rolled around the tube surface under continuing pressure to cut an annular groove which is progressively deepened until the tube is severed.

Because of the conditions under which such tube cutters are used, it is desirable that they be readily operable by hand by one person and therefore lightness, compactness and ease of operation are very desirable and important qualities. These tube cutters are usually considered as perishable tools of the toolbox variety and therefore should be inexpensive to manufacture, but sufficiently rugged that such delicate parts as the cutting wheel will not be readily damaged under the abuse usually accorded to tools of this variety.

An object of this invention is to provide a hand-type tube cutter having a compact arrangement of its component parts and being of light weight and rugged construction while retaining full cutting capacity as to tube size and wall thickness.

Another object of this invention is to provide a hand-type tube cutter which lends itself to simplified manufacturing procedures and has structural parts which can be formed by cutting from an extruded bar without the need of performing stamping or forging operations on the individual parts so formed.

Another object of this invention is to provide a compact hand-type tube cutter in which the cutter wheel is protected from damage. This protection is provided by a stop which is an integral part of the frame structure and prevents the cutter wheel from hitting the tube carrier, and also by a guard portion which encloses and protects that portion of the cutter wheel which is away from the tube carrier to prevent damage from external blows.

Other objects and advantages of this invention will become apparent upon reading the following detailed description of a preferred embodiment of the invention, as shown in the accompanying drawings.

In the drawings:

FIG. 1 is a side elevational view of a preferred embodiment of a tube cutter constructed according to the present invention;

FIG. 2 is an end elevational view of the tube cutter shown in FIG. 1 as seen from the left-hand side of FIG. 1;

FIG. 3 is a fragmentary sectional view showing the mounting for the cutter wheel carrier;

FIG. 4 is a pictorial view of an extruded bar and a blank for the tube carrier cut from it;

FIG. 5 is a pictorial view of the cutter wheel carrier in fully machined form;

FIG. 6 is a pictorial view of an extruded bar and a blank for the frame cut from it; and FIG. 7 is a pictorial view of the frame in fully machined form.

Referring now to the drawings in greater detail, and particularly to FIG. 1, the tube cutter includes a frame 10 comprising a compact rectangular body portion 11 and an elongated extension 12 projecting angularly outward from body portion 11. The extension 12 terminates in a pair of legs 13 and 14 which are separated by a lateral slot 15. The ends 16 and 17 of legs 13 and 14, respectively, are drilled at 19 to receive a pivot pin 18 which is fixed in each of the ends 16 and 17 and extends transversely across slot 15. The pivot pin 18 is preferably in the form of a longitudinally slotted tube formed of rolled sheet metal which tends to spring and expand circumferentially and thus hold tightly in place within the holes 19 in ends 16 and 17.

The cutter wheel carrier 20 is in the form of an L-shaped bell crank having a lever arm 21 and a carrier arm 22, arms 21 and 22 forming an included angle of about 90°. The cutter wheel carrier 20 is pivotally journalled on pivot pin 18 by a transverse hole 23 located at the junction of its arms 21 and 22.

In order to mount the cutter wheel 24, the end of carrier arm 22 is divided into a pair of support arms 25 and 26 by a laterally extending slot 27. The support arms 25 and 26 are drilled at 28a to receive a transversely extending pin or axle 28 which is preferably of the same construction as that of the pivot pin 18. The cutter wheel 24 is of the usual type, having an annular cutting edge 29 and a hole 30 which is rotatably journalled on axle 28.

The tube which is to be cut, as indicated by dots and dashed lines at 37 in FIG. 1, is positioned under the cutter wheel 24 by a tube carrier 38. The tube carrier 38 is in the form of a shallow V notch in the frame 10 and extending parallel to the axis of axle 28, with one side of the V being a side 39 of extension 12 and the other side 40 being formed on body portion 11.

The necessary cutting pressure is applied to the cutter wheel by a thumb screw 31 having a threaded shank 32 which passes through a mating threaded hole 33 in body portion 11. The thumb screw 31 is provided on its outer end with a flattened head 34 for easy manual operation and has a rounded tip 35 on the other end of shank 32 to engage a bearing pad 36 located on the inner side of lever arm 21. It will be seen that rotation of the thumb screw 31 in one direction will cause the tip 35 to move outward from the body portion 11 and through contact with the bearing pad 36 rotate the cutter wheel carrier 20 about pivot pin 18 and force the cutter wheel 24 into the tube being cut.

As is shown most clearly in FIGURE 3, inward movement of the cutter wheel is arrested before the cutter wheel can contact the tube carrier 32 with resultant damage to both the tube carrier and the cutter wheel. This is accomplished by positioning the bottom surface 41 of slot 15 so that carrier arm 22 comes into abutting contact with the bottom surface 41 to prevent further motion of the cutter wheel carrier 20 before the cutter wheel can contact the sides of the tube carrier 38. The cutter wheel is also protected against external blows such as might result from dropping the tube cutter by means of the projecting semicircular ears 42 on the two support arms 25 and 26 which extend radially outward from axle 28 a greater distance than the radius of the cutting edge of the cutter wheel 24. These projecting ears also serve as a safety feature inasmuch as they prevent injury to the user of the cutter through accidental contact with the sharp cutting edge 29 while the tool is in use.

The configurations of the frame 10 and the cutter wheel carrier 20 lend themselves readily to simplified methods of manufacture. In the preferred method of manufacture of these parts, advantage is taken of modern methods of extruding metals into elongated bars having a complex cross-sectional shape. These parts can be made of such materials as brass or aluminum alloy, which lend themselves readily to extrusion into bars of any desired cross-sectional form with an excellent surface finish and close dimensional tolerances. As is shown in FIGURE 4, a bar 50 is extruded from brass or other material to have a formed surface 51 with the same dimensions and contour as that of the finished cutter wheel carrier 20. Individual blanks 52 are cut from the bar 50 by means of parallel transverse saw cuts 53 spaced apart the width of the finished part. The end surfaces 54 produced by these saw cuts will then be the finished side surfaces, and the machining of the part will be complete after the cutting of the lateral slot 27 and the drilling of the holes 23 and 28a.

The frame 10 is made in a similar manner from another extruded bar 60, as shown in FIG. 6, having a formed surface 61 with the finish end dimensions of the same surfaces on the finished part. The blank 62 is formed by transverse parallel saw cuts 63 spaced apart the finished width of the frame. The end surfaces 64 produced by the saw cuts 63 do not require additional finishing, and the frame 10 will be in fully machined form after cutting slot 15, drilling the holes 19 for the pivot pin, and drilling and tapping the threaded hole 33 for the thumb screw 31.

The complete tube cutter can be assembled from its component parts with a minimum of steps. The hole 30 in cutter wheel 24 is aligned with the axle holes 28a in the cutter wheel carrier 20, and the axle 28 is pressed or tapped into place. In a like manner, the transverse hole 23 in the cutter wheel carrier 20 is aligned with the pivot pin holes 19 on the extension 12 and the pivot pin 18 is pressed or tapped into position. After the thumb screw 31 is inserted into the threaded hole 33, the assembly is complete.

The above described embodiment of the invention has been shown and described for purposes of illustration only, and it is understood that various modifications and rearrangements can be made in the construction and method of manufacture of the invention without departing from the scope of the invention as defined in the following claims.

Having thus described my invention, I claim:

1. A tube cutter comprising a frame having a body portion and a leg extending outward from said body portion, a lever having angularly disposed arms pivotally mounted intermediate said arms on said leg, tube carrier means on said body portion, a screw in threaded engagement with said body portion adjacent said tube carrier means, a cutter wheel rotatably journalled on one arm of said lever, the other arm of said lever being engageable by said screw whereby movement of said screw in one direction rotates said lever about said pivot to move said cutter wheel toward said tube carrier means and toward said screw.

2. A tube cutter comprising a frame having a body portion and a leg extending outward from said body portion, a lever having angularly disposed arms pivotally mounted intermediate said arms on said leg, tube carrier means on said body portion, a screw in threaded engagement with said body portion adjacent said tube carrier means, the perpendicular distance between the axis of a tube mounted in cutting position on said tube carrier means and the axis of said screw being less than the distance between said tube axis and said lever pivot, a cutter wheel rotatably journalled on one arm of said lever, the other arm of said lever being engageable by said screw whereby movement of said screw in one direction rotates said lever about said pivot to move said cutter wheel toward said tube carrier means and toward said screw.

3. A tube cutter comprising a frame having a body portion and a leg extending outward from said body portion, a lever having angularly disposed arms pivotally mounted intermediate said arms on said leg, tube carrier means on said body portion, a cutter wheel rotatably journalled on one arm of said lever adjacent its end, stop means on said frame limiting travel of said one arm to prevent contact between said cutter wheel and said tube carrier means, a screw in threaded engagement with said body portion adjacent said tube carrier means, said screw being engageable with the other arm of said lever whereby movement of said screw in one direction rotates said lever about said pivot to move said cutter wheel toward said tube carrier means and toward said screw.

4. A tube cutter comprising a frame having a body portion and a leg extending outward from said body portion, a bell crank pivotally mounted intermediate its ends on the outer end of said leg, the arms of said bell crank extending at acute angles to the axis of said leg and toward said body portion, one arm on each side of said leg, tube carrier means on said body portion, a screw in threaded engagement with said body portion adjacent said tube carrier means, a cutter wheel rotatably journalled on one arm of said bell crank, the other arm of said bell crank being engageable by said screw whereby movement of said screw in one direction rotates said lever about said pivot to move said cutter wheel towards said tube carrier means and towards said screw.

5. A tube cutter comprising a frame having a body portion and a leg extending outward from said body portion, the outer end of said leg terminating in a forked portion, a pivot pin mounted in said forks and extending transversely between them, a bell crank pivotally mounted intermediate its ends on said pivot pin, the arms of said bell crank extending at acute angles to the axis of said leg and toward said body portion, one arm on each side of said leg, tube carrier means on said body portion, a screw in threaded engagement with said body portion adjacent said tube carrier means, a forked portion on the end of one arm of said bell crank, an axle mounted on said forks and extending transversely between them, a cutter wheel rotatably journalled on said axle, and a bearing pad on the other arm of said bell crank engageable by said screw whereby movement of said screw in one direction rotates said bell crank about said pivot pin to move said cutter wheel toward said tube carrier means and toward said screw.

6. A tube cutter comprising a frame having a body portion and a leg extending angularly outward from said body portion, a bell crank pivotally mounted intermediate its ends on the outer end of said leg, the arms of said bell crank extending at acute angles to the axis of said leg and toward said body portion, one arm on each side of said leg, tube carrier means on said frame, said tube carrier means including a first surface on said leg and a second surface on said body portion intersecting said first surface, a screw in threaded engagement with said body portion adjacent said tube carrier means, a cutter wheel rotatably journalled on one arm of said bell crank, the other arm of said bell crank being engageable by said screw whereby movement of said screw in one direction rotates said bell crank about said pivot to move said cutter wheel toward the surfaces of said tube carrier means and toward said screw.

7. A tube cutter comprising a frame having a body portion and a leg extending outward from said body portion, the outer end of said leg terminating in a forked portion, a pivot pin mounted in said forks and extending transversely between them, a bell crank pivotally mounted intermediate its ends on said pivot pin, the arms of said bell crank extending at acute angles to axis of said leg and toward said body portion, one arm on each side of said leg, tube carrier means on said body portion, a screw in threaded engagement with said body portion adjacent tube carrier means, one arm of said bell crank extending substantially parallel to said screw toward said tube carrier means, a forked portion on the end of said one arm, an axle mounted on said forks and extending transversely between them, a cutter wheel rotatably journalled on said axle, the other arm of said bell crank extending substantially perpendicular to said screw, and a bearing pad on said other arm engageable by said screw whereby movement by said screw in one direction rotates said bell crank about said pivot pin to move said cutter wheel toward said tube carrier means and toward said screw.

References Cited in the file of this patent

UNITED STATES PATENTS 2,734,267     Palmer _____ Feb. 14, 1956

FOREIGN PATENTS 2,395     Great Britain _____ of 1866